United States Patent
Coleman

(10) Patent No.: US 10,745,939 B2
(45) Date of Patent: Aug. 18, 2020

(54) WIRELESS TRANSMITTER AND RELATED SYSTEMS AND METHODS

(71) Applicant: Won-Door Corporation, Salt Lake City, UT (US)

(72) Inventor: William Michael Coleman, Salt Lake City, UT (US)

(73) Assignee: Won-Door Corporation, Salt Lake City, UT (US)

( * ) Notice: Subject to any disclaimer, the term of this patent is extended or adjusted under 35 U.S.C. 154(b) by 0 days.

(21) Appl. No.: 16/031,817

(22) Filed: Jul. 10, 2018

(65) Prior Publication Data
US 2020/0018095 A1  Jan. 16, 2020

(51) Int. Cl.
*H04B 1/40* (2015.01)
*E05B 47/00* (2006.01)
*E05B 27/00* (2006.01)

(52) U.S. Cl.
CPC ...... *E05B 47/0012* (2013.01); *E05B 27/0007* (2013.01); *E05B 2047/0051* (2013.01)

(58) Field of Classification Search
CPC ............. E05B 47/0012; E05B 27/0007; E05B 2047/0051; E05B 81/14
See application file for complete search history.

(56) References Cited

U.S. PATENT DOCUMENTS

| | | | |
|---|---|---|---|
| 5,057,657 A * | 10/1991 | Skulic | H01H 13/705 200/342 |
| 6,747,573 B1 | 6/2004 | Gerlach et al. | |
| 6,832,072 B2 | 12/2004 | Buckingham et al. | |
| 7,019,241 B2 | 3/2006 | Grassl et al. | |
| 7,391,135 B2 | 6/2008 | Schmidt | |
| 7,891,641 B1 * | 2/2011 | Miller | B66D 1/16 254/344 |
| 9,713,231 B2 | 7/2017 | Kelly et al. | |
| 2005/0275581 A1 * | 12/2005 | Grassl | H01L 41/1136 341/173 |
| 2006/0185404 A1 * | 8/2006 | Hansen | E05B 9/084 70/38 A |
| 2017/0032593 A1 * | 2/2017 | Patel | G07C 9/00309 |
| 2017/0076888 A1 * | 3/2017 | Ruff | H01H 23/143 |

OTHER PUBLICATIONS

PTM 210U/ PTM 215/ PTM210U/ PTM 210J Pushbutton Transmitter Modules User Manual, May 2017, 20 pages, Dolphin Self-powered IoT by EnOcean.
PTM 210U Push button multi-channel switch module Data Sheet, Dec. 2017, 1 page, Dolphin Self-powered IoT by EnOcean.

* cited by examiner

*Primary Examiner* — Nhan T Le
(74) *Attorney, Agent, or Firm* — TraskBritt

(57) ABSTRACT

A wireless transmitter including a rotating actuator, a plate connected to the rotating actuator, and a wireless switch. The wireless switch may include at least one actuating panel and at least one transducer element. The at least one transducer element may be configured to convert mechanical energy to electrical energy. The at least one actuating panel may be configured to transmit mechanical energy to the at least one transducer element. The plate may be configured to contact the wireless switch at a rotational end point of the rotating actuator.

19 Claims, 6 Drawing Sheets

WIRELESS TRANSMITTER AND RELATED SYSTEMS AND METHODS

TECHNICAL FIELD

The disclosure relates to wireless transmitters and related systems and methods. In particular, embodiments of the disclosure relate to wireless transmitters, wireless switches, wireless communication systems, and related methods.

BACKGROUND

Many systems utilize remote switches or sensors. Some examples of remote switches or sensors include light switches, door switches, override switches, temperature sensors, pressure sensors, etc. Generally, the remote switches or sensors require a wired connection between the switches or sensors and a device or control system with which the switches or sensors are communicating. In some systems the switch or sensor may be directly connected to the device it is controlling. For example, a light switch may be directly connected to the light it turns on and off.

The wired connection can be cumbersome during installation. Generally, a wired connection is installed or prepared for installation before walls are completed during construction. When walls are completed before the wired connection is prepared for installation (e.g., roughed in) the installation may require additional time and effort to install wires within the wall (e.g., fishing wires into wall). Additionally, some walls are formed from materials that cannot be penetrated once complete (e.g., concrete) or include barriers (e.g., fire breaks, studs, windows, side lights, etc.) within the wall making installation after the wall is completed impossible. Often installing wired connections into completed walls results in damage to the walls and additional repair costs.

BRIEF SUMMARY

Some embodiments of the present disclosure may include a wireless transmitter. The wireless transmitter may include a rotating actuator, a plate connected to the rotating actuator, and a wireless switch. The wireless switch may include at least one actuating panel and at least one transducer element. The at least one transducer element may be configured to convert mechanical energy to electrical energy. The at least one actuating panel may be configured to transmit mechanical energy to the at least one transducer element. The plate may be configured to contact the wireless switch at a rotational end point of the rotating actuator.

Some embodiments of the present disclosure may include a wireless communication system. The wireless communication system may include an energy-autonomous wireless transmitter and a receiver. The energy-autonomous wireless transmitter may include a rotating actuator, a rocker arm, and a wireless switch. The rocker arm may be connected to the rotating actuator. The wireless switch may include at least one actuating panel and at least one transducer element. The at least one transducer element may be configured to convert mechanical energy to electrical energy. The at least one actuating panel may be configured to transmit mechanical energy to the at least one transducer element. The rocker arm may be configured to contact the wireless switch at a rotational end point of the rotating actuator. The energy-autonomous transmitter may be configured to transmit a signal and the receiver may be configured to receive the signal. The receiver may be configured to perform an operation based on the signal.

Some embodiments of the present disclosure may include a method of transmitting a wireless signal. The method may include rotating a lock cylinder attached to a rocker arm. The distal end of the rocker arm may contact an energy-autonomous wireless transmitter at an end point of a rotational range of the lock cylinder. The contact between the energy-autonomous wireless switch and the distal end of the rocker arm may input mechanical energy into the energy-autonomous wireless switch. The mechanical energy may be converted into electrical energy and a signal may be transmitted with the electrical energy.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
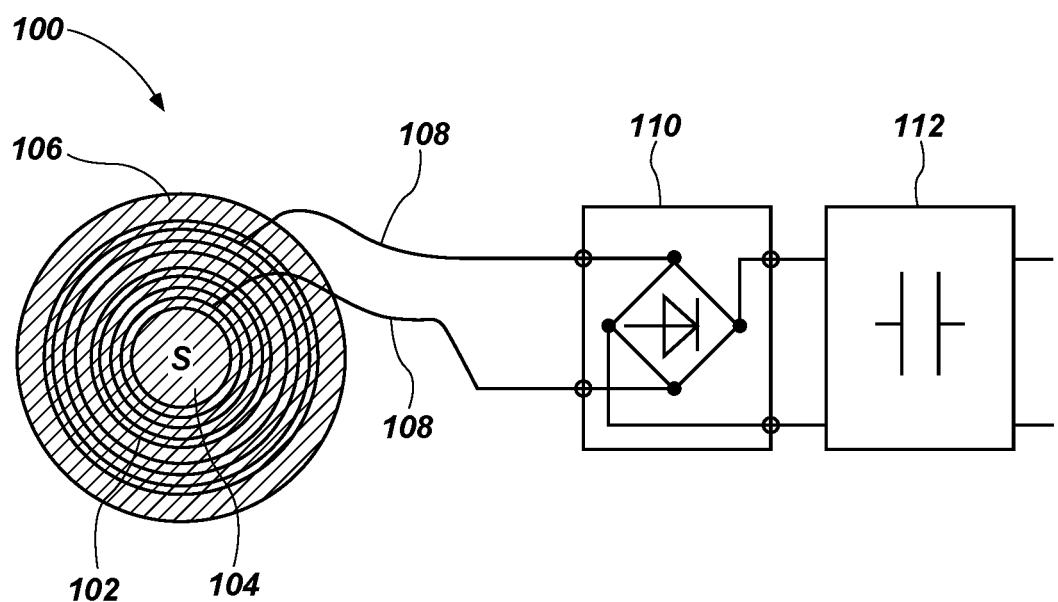
FIG. 1 shows a plan view of an embodiment of an electromagnetic energy converter.

The illustrations presented herein are not meant to be actual views of any particular wireless transmitter, wireless communication system, or component thereof, but are merely idealized representations employed to describe illustrative embodiments. The drawings are not necessarily to scale. Elements common between figures may retain the same numerical designation.

As used herein, any relational term, such as "first," "second," "over," "beneath," "top," "bottom," "underlying," "up," "down," "front," "back," etc., is used for clarity and convenience in understanding the disclosure and accompanying drawings, and does not connote or depend on any specific preference, orientation, or order, except where the context clearly indicates otherwise. For example, these terms may refer to an orientation of elements relative to each other (e.g., as illustrated in the figures).

As used herein, the terms "vertical" and "horizontal" may refer to a drawing figure as oriented on the drawing sheet, and are in no way limiting of orientation of an apparatus, or any portion thereof, unless it is apparent that a particular orientation of the apparatus is necessary or desirable for operation in view of gravitational forces. For example, when referring to elements illustrated in the figures, the terms "vertical" or "horizontal" may refer to an orientation of elements with respect to each other.

As used herein, the term "and/or" means and includes any and all combinations of one or more of the associated listed items.

As used herein, the terms "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term lock means and includes security or controlled access devices that may be actuated with keys (e.g., pin tumbler, mortise, lever tumbler, cylinder, bored cylinder, magnetic coded, etc.), specialized tools (e.g., tamperproof screw drivers, tamperproof wrench, etc.), proximity systems (e.g., proximity cards, fobs, mobile IDs, etc.), combination locks (e.g. single dial lock, multi dial lock, key pad locks, etc.).

Some embodiments of the present disclosure may include wireless transmitters or switches that may be engaged by a rotational input (e.g., key switch, knob, dial, etc.). Wireless transmitters allow remote switches or sensors to be installed after a wall is completed without damaging the wall or fishing wires into the wall. Some wireless transmitters known in the art may include an external power source such as a battery, as described in U.S. Pat. No. 6,832,072 to Buckingham et al., issued Dec. 14, 2004, and U.S. Patent Publication 2015/0382436 to Kelly et al., published Dec. 31, 2015, now U.S. Pat. No. 9,713,231, issued Jul. 18, 2017, the disclosure of each of which is incorporated herein in its entirety by this reference. Wireless transmitters may provide a signal to a receiver that may then be translated into an operation at an end device.

Wireless transmitters that include an external power source may present additional problems such as the need for constant maintenance to check, recharge, and/or change batteries, and a range that reduces as the battery discharges and reduces the power behind the signal. The reducing range eventually results in an inoperative system when the signal is sufficiently weak that it fails to be detected by the receiver. If an alternative external power source is used often it requires providing power wires to the transmitter which defeats the purpose of avoiding pulling wires through finished walls.

Some embodiments of the present disclosure may include energy autonomous wireless transmitters. Some wireless transmitters utilize energy harvesting techniques to convert mechanical energy into electrical energy and provide a wireless signal from the electrical energy as described in U.S. Pat. No. 7,019,241 to Grassl et al., issued Mar. 28, 2006, and U.S. Pat. No. 7,391,135 to Schmidt, issued Jun. 24, 2008, the disclosure of each of which is incorporated herein in its entirety by this reference.

FIG. 1 illustrates an embodiment of an electromagnetic energy converter 100 (e.g. transducer). In some embodiments, the electromagnetic energy converter 100 may be used as an energy harvester to convert mechanical energy into electrical energy. The electromagnetic energy converter 100 may include an electrical coil 102 concentrically located between a first permanent magnet 104 and a second permanent magnet 106. In some embodiments, the first permanent magnet 104 may be configured to move relative to the second permanent magnet 106 and the electrical coil 102 along a common axis. As the first permanent magnet 104 moves relative to the second permanent magnet 106 and the electrical coil 102 a current may be induced in the electrical coil 102. In some embodiments, the current induced may be passed through electrical connections 108 to additional circuitry to power radio switches and/or radio sensors that can be operated briefly without an energy storage device.

In some embodiments, the additional circuitry may include an electrical converter 110 (e.g., rectifier, bridge rectifier) and/or an energy storage device 112 (e.g., capacitor). In some embodiments, the energy storage device 112 or the electrical converter 110 may be connected to a signal transmitting device (e.g., radio switches, radio sensors, etc.). In some embodiments, the electrical connections 108 may be directly connected to the signal transmitting device without any intervening circuitry.

In some embodiments, the first permanent magnet 104 may include a biasing element (e.g., spring, washers, compressible fluids, magnetic biasing, resilient materials, etc.) configured to bias the first permanent magnet 104 toward an initial position. The biasing element may allow a first current to be induced when a force is applied to the first permanent magnet 104 to induce the movement and a second current to be induced when the force is released and the first permanent magnet 104 returns to the initial position under the influence of the biasing element. In some embodiments, the second permanent magnet 106 may move relative to the first permanent magnet 104 and the electrical coil 102 in the same manner. In some embodiments, both the first permanent magnet 104 and the second permanent magnet 106 may be configured to move relative to each other.

Figure 2:
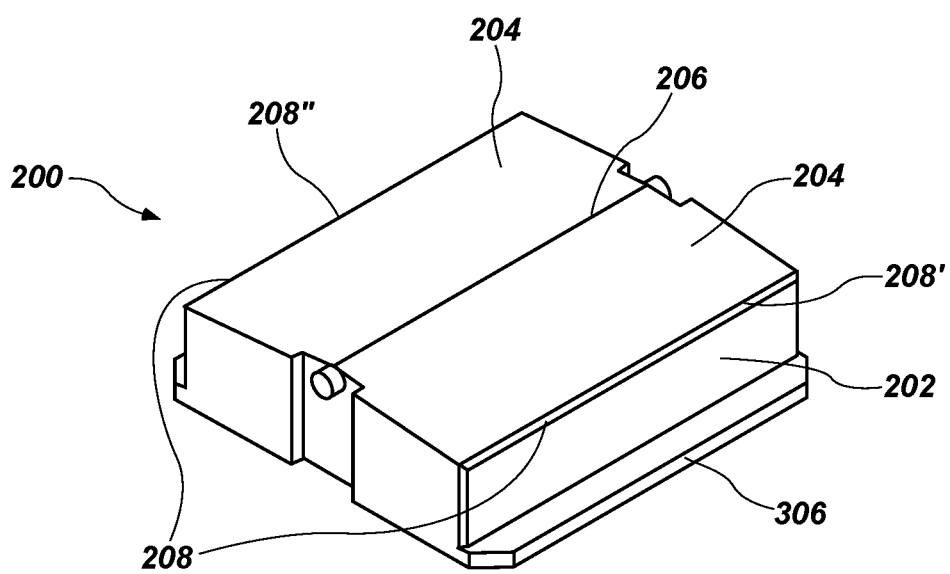
FIG. 2 shows an isometric view of an embodiment of a wireless switch.

FIG. 2 illustrates a wireless switch 200. The wireless switch 200 may include a casing 202 configured to protect sensitive electronics within the casing 202 and/or facilitate interaction between external and internal components of the wireless switch 200. In some embodiments, the wireless switch 200 may be a wireless switch module PTM-210U manufactured by EnOcean headquartered in Oberhaching Germany with a North American Office in Cottonwood Heights, Utah and sold by Ad Hoc Electronics in Lindon, Utah among other distributors. In some embodiments, at least one energy harvester element (e.g. transducer, electromagnetic energy converter, etc.) may be housed within the casing 202. In some embodiments, the casing 202 may include switching panels 204 configured to transmit a force to the at least one energy harvester element to induce a signal. In some embodiments, the switching panels 204 may be connected along a center line 206 (e.g., hinge, joint), such that a distal edge 208 of the switching panels 204 depresses into the casing 202 while an edge adjacent to the center line 206 remains stationary relative to the casing 202. In some embodiments, the switching panels 204 may move as independent units into or out of the casing 202 similar to a button. In other embodiments, the at least one energy harvester element may be engaged through buttons, a flexible membrane, levers, rocker arms, etc.

In some embodiments, the wireless switch 200 may include at least two energy harvester elements. The switching panels 204 may include a first distal edge 208' and a second distal edge 208". The first distal edge 208' may be coupled to a first energy harvester element and the second distal edge 208" may be coupled to a second energy harvester element. The first distal edge 208' and the second distal edge 208" may be individually actuated thereby engaging the at least two energy harvester elements individually.

Figure 3A:
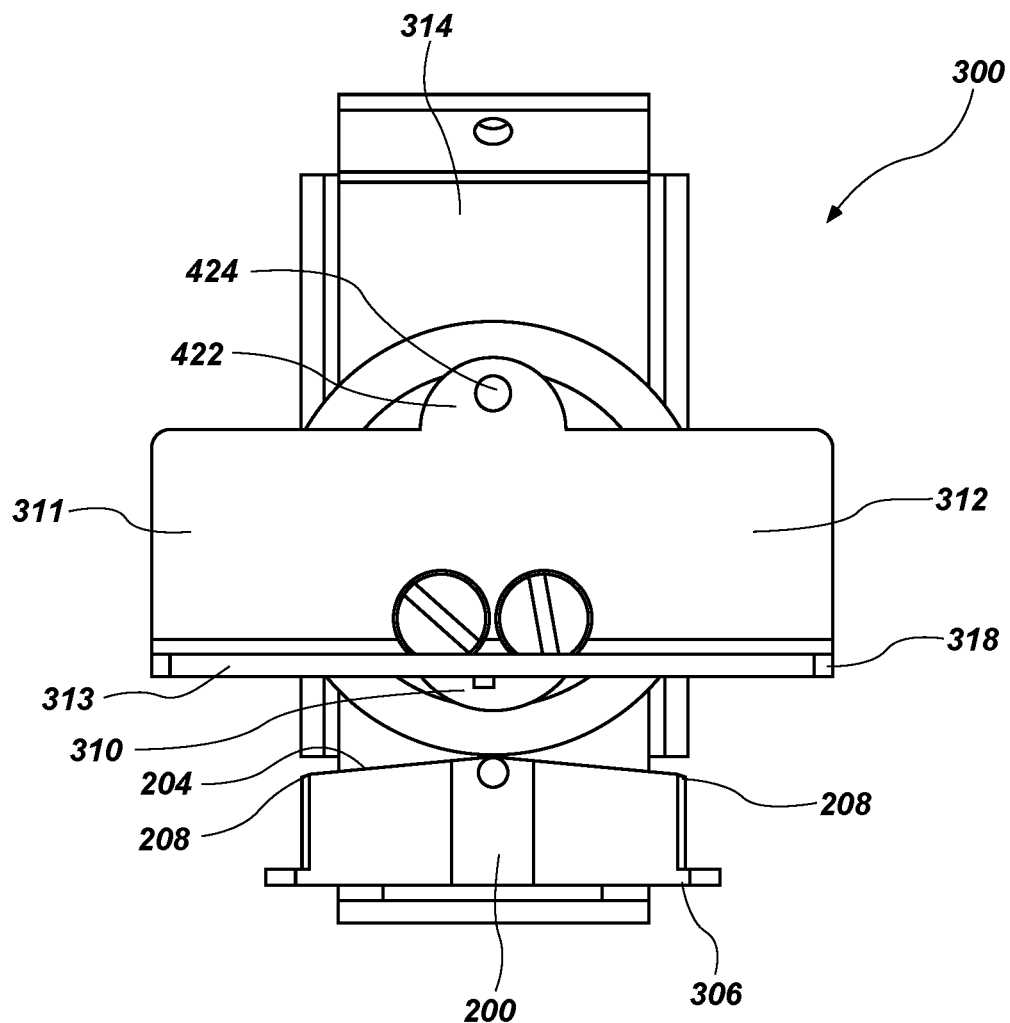
FIG. 3A shows a perspective view of an embodiment of a rotating actuator interfacing with an embodiment of a wireless switch.
Figure 3B:
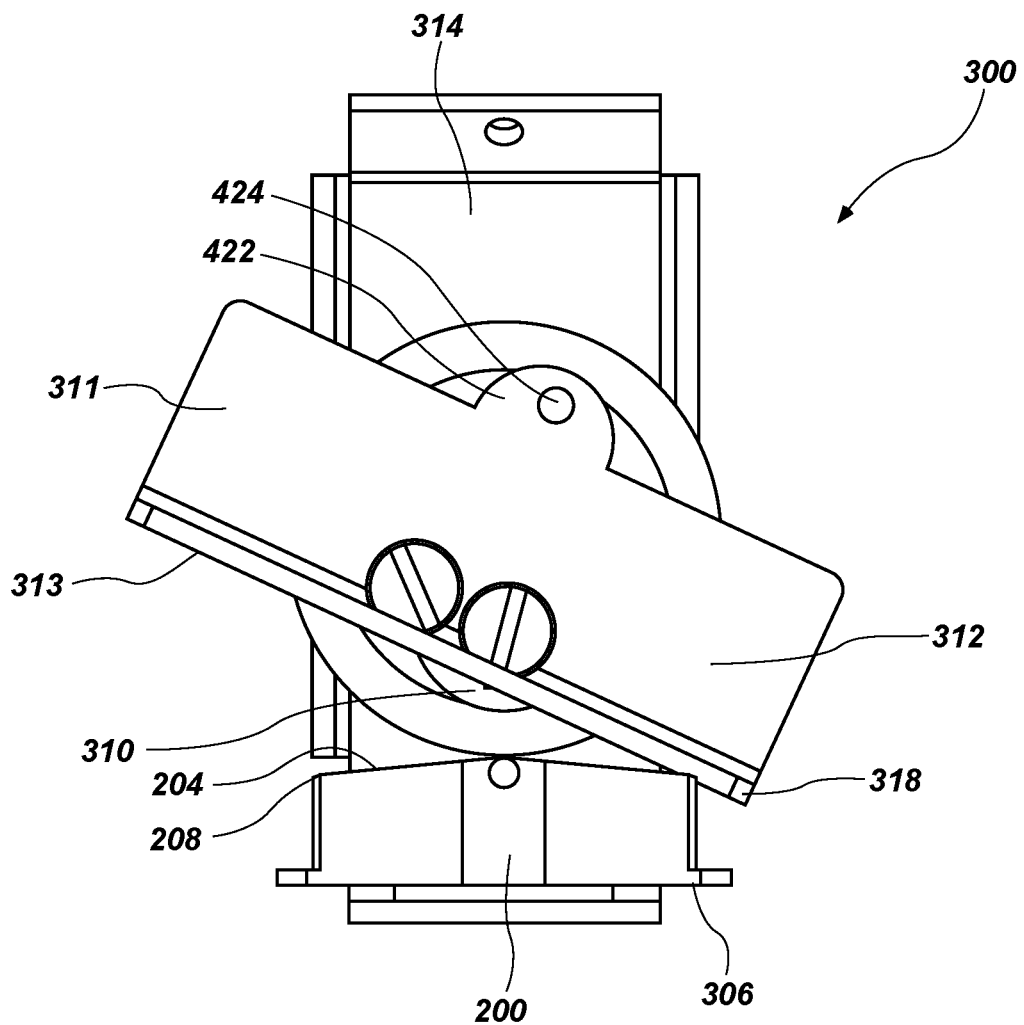
FIG. 3B shows a perspective view of an embodiment of a rotating actuator interfacing with an embodiment of a wireless switch.

In some embodiments, a user interface may include a rotational input. FIGS. 3A and 3B illustrate an embodiment of a rotating actuator 300 interfacing with an embodiment of a wireless switch 200. In some embodiments, the rotating actuator 300 may include a rotational input 310 (e.g., cylinder, tumbler, lock cylinder, shaft, spindle, etc.). The rotational input 310 may be attached to a rocker arm 312 (e.g., plate, shelf, lever, cam plate, etc.). The rocker arm 312 may be attached to the rotational input 310 through a hardware connection (e.g., screws, bolts, rivets, brads, nails, pins, clips, etc.), an adhesive (e.g., glue, epoxy, etc.), and/or a welded connection (e.g., brazed, soldered, etc.). In some embodiments, the rocker arm 312 may be integrally formed as part of the rotational input 310.

In some embodiments, the rocker arm 312 may be a straight member with an L-shaped cross-section where a vertical side 311 is configured to attach to the rotational input 310 and a horizontal side 313 is configured to interact with the wireless switch 200. The rocker arm 312 may be formed from a rigid material such as metal (e.g., steel, stainless steel, brass, zinc, nickel, aluminum, etc.), hard plastic (e.g., polyvinyl chloride, high-density polyethylene, polypropylene, acrylonitrile butadiene styrene, etc.), or wood. The rocker arm 312 may have a length between about 1 in (2.54 cm) and about 4 in (10.16 cm), such as between about 2 in (5.08 cm) and about 3 in (7.62 cm). In some embodiments, the rocker arm 312 may be formed from a flat piece of material (e.g., flat stock, square stock, etc.), a cylindrical member (e.g., pipe, round stock, dowel, rod, etc.), or other forms of material.

In an initial position, illustrated in FIG. 3A, the rocker arm 312 may be substantially parallel with a bottom surface 306 of the wireless switch 200. A bracket 314 (e.g., mount, clamp, retainer, etc.) may be configured to secure the rotating actuator 300 a distance (e.g., specified distance, height, gap) from the bottom surface 306 of the wireless switch 200. In some embodiments, the distance between a center point of the rotating actuator 300 and the bottom surface 306 of the wireless switch may be between about 0.1 in (0.254 cm) and about 2 in (5.08 cm) such as between about 1 in (2.54 cm) and about 1.5 in (3.81 cm), or between about 1.25 in (3.175 cm) and about 1.325 in (3.37 cm). The distance may define the amount of rotation available for the rotating actuator 300 before the rocker arm 312 contacts the wireless switch 200. The distance may allow the rotating actuator 300 to rotate through an angle from vertical of at least 10° such as, at least 20°, at least 30°, or at least 45°. In some embodiments, the bracket 314 may be configured to allow adjustment of the distance (e.g., through an adjustable mount, movable member, or slot) resulting in an adjustment of the angle of rotation available for the rotating actuator 300.

FIG. 3B illustrates the rotating actuator 300 at a rotational end point. When the rotating actuator 300 reaches the rotational end point, as defined by the distance between the rotating actuator 300 and the bottom surface 306 of the wireless switch 200, a distal end 318 of the rocker arm 312 may contact a distal edge 208 of the switching panel 204 of the wireless switch 200. When the distal end 318 of the rocker arm 312 contacts the distal edge 208 of the switching panel 204 the rocker arm 312 may cause the distal edge 208 of the switching panel 204 to depress into the wireless switch 200. As the distal edge 208 of the switching panel 204 depresses into the wireless switch 200 it may engage an energy harvester element within the wireless switch 200. When the energy harvester element is engaged it may transmit a signal. After the rotating actuator 300 reaches the rotational end point, the rotating actuator 300 may be returned to the initial position. When the rotating actuator 300 returns to the initial position the rocker arm 312 may release the switching panel 204, which may in turn release the energy harvester element generating a second signal.

Figure 4:
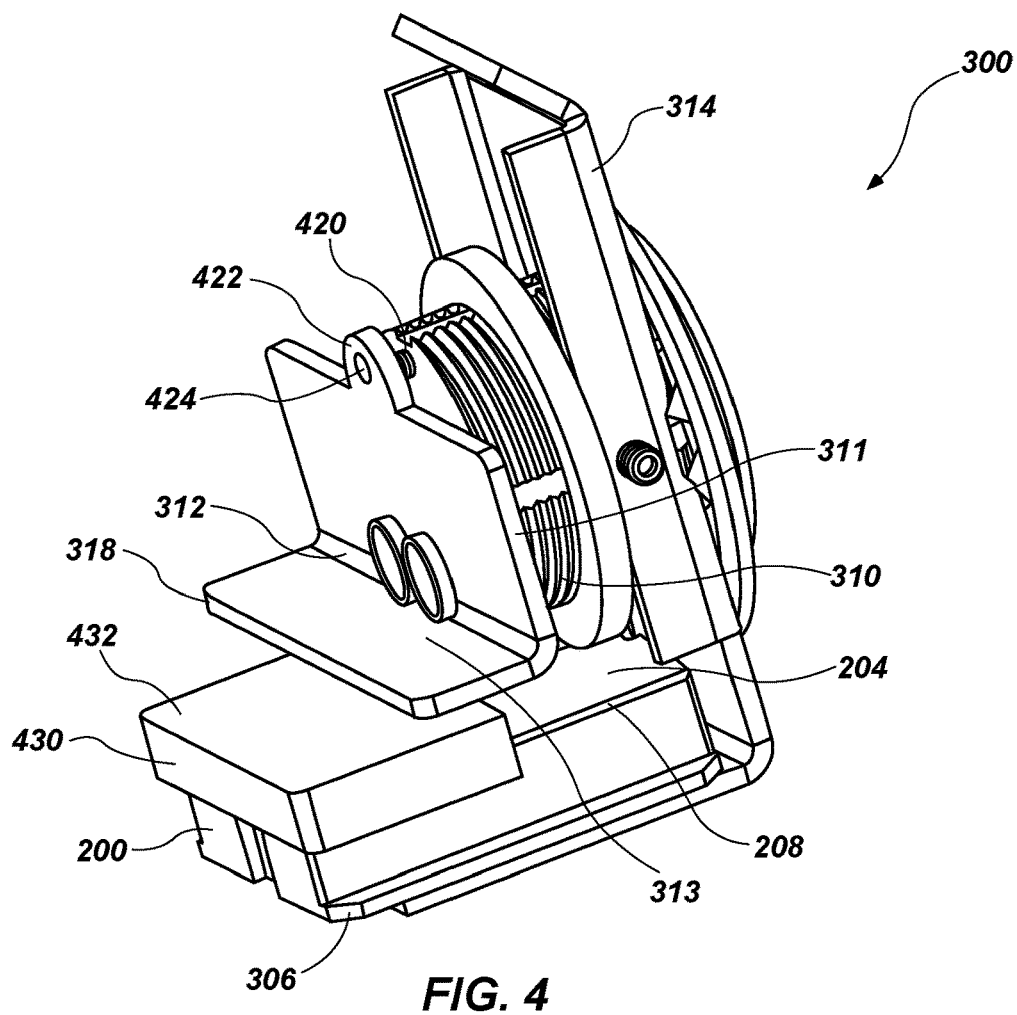
FIG. 4 shows an isometric view of an embodiment of a rotating actuator.

FIG. 4 illustrates an embodiment of the rotating actuator 300. In some embodiments, the rotating actuator 300 may include a biasing element 420 (e.g., spring, washers, compressible fluid, magnetic biasing, resilient material, etc.) configured to bias the rotating actuator 300 to an initial position. In some embodiments, the biasing element 420 may connect the rocker arm 312 to the bracket 314. The rocker arm 312 may include a top mount 422 configured to couple the rocker arm 312 to the biasing element 420. The top mount 422 may include a hole 424 (e.g., notch, eyelet, ring, opening, slot) configured to couple the biasing element 420 to the rocker arm 312. In some embodiments, the bracket 314 may also include a hole configured to couple the biasing element 420 to the bracket 314. In some embodiments, the biasing element may be permanently attached (e.g., welded, attached with adhesive, integrally formed) to at least one of the bracket 314 and/or the rocker arm 312.

In some embodiments, the wireless switch 200 may include a button extension 430. The button extension 430 may be configured to provide an interface between the rocker arm 312 and the wireless switch. The button extension 430 may have a top surface 432 configured to provide a planar surface that the rocker arm 312 may contact after rotation. When the top surface 432 of the button extension 430 is contacted by the rocker arm 312 the button extension 430 may then activate the wireless switch 200 through the switching panels 204. In some embodiments, the wireless switch 200 may include buttons (e.g., contacts, contact pads, momentary switch, etc.). The button extension 430 may provide an interface between the rocker arm 312 and the buttons on the wireless switch 200 configured to ensure the buttons are activated when the rocker arm 312 rotates and contacts the top surface 432 of the button extension 430.

Figure 5:
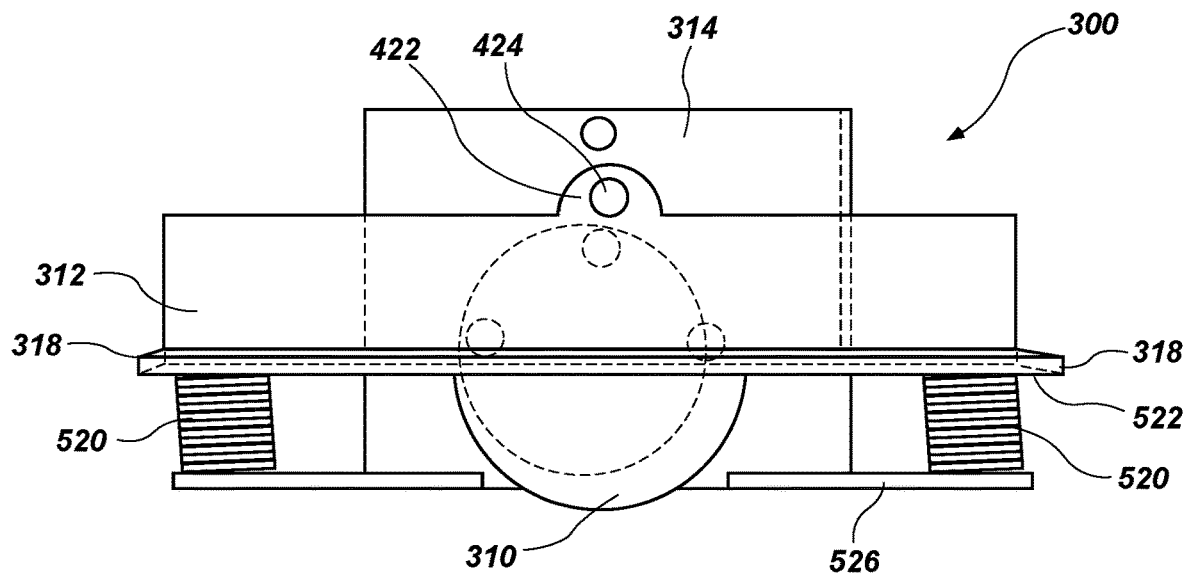
FIG. 5 shows a perspective view of an embodiment of a rotating actuator.

FIG. 5 illustrates an embodiment of the rotating actuator 300. In some embodiments, the rotating actuator 300 may include at least one biasing element 520. In some embodiments, the at least one biasing element 520 may be positioned between the distal end 318 of the rocker arm 312 and the bracket 314. For example, the bracket 314 may include a shelf 526 configured to retain the at least one biasing element 520 on at least one end of the at least one biasing element 520 while a bottom surface 522 of the rocker arm 312 on an opposite end of the at least one biasing element 520 may be configured to retain the at least one biasing element 520 on the opposite end. In some embodiments, the at least one biasing element 520 may include at least two biasing elements 520 positioned on opposite distal ends 318 of the rocker arm 312. In some embodiments, the at least two biasing elements 520 may be connected to the bracket 314 at a central location and extend at an angle to the distal ends 318 of the rocker arm 312.

Figure 6:
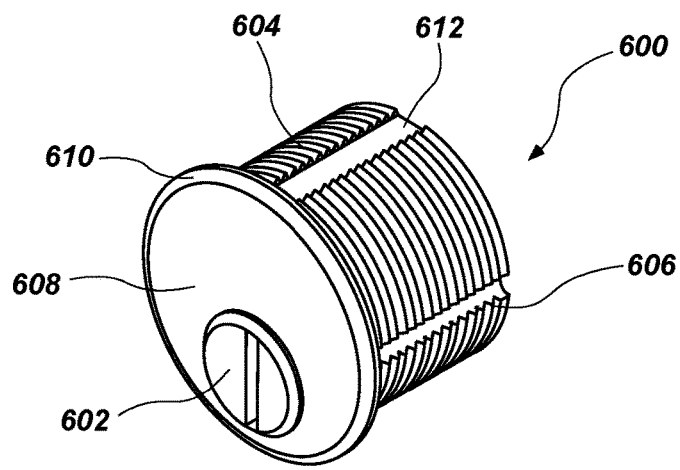
FIG. 6 shows an isometric view of an embodiment of a rotational input.

FIG. 6 illustrates an embodiment of a rotational input 600. In some embodiments, the rotational input 600 may include a lock actuator 602. For example, the rotational input 600 may be a lock cylinder. In some embodiments, the lock actuator 602 may be inserted into the rotational input 600. An exterior portion 604 of the rotational input 600 may be configured to secure the rotational input 600 to a bracket or frame. In some embodiments, the exterior portion 604 may remain stationary relative to the bracket or frame while the lock actuator 602 rotates relative to the exterior portion 604 and/or the bracket or frame.

In some embodiments, the lock actuator 602 may include a keyed cylinder. The keyed cylinder may include a keyway and pin tumblers configured to ensure that only specific keys may turn the lock actuator 602. In some embodiments, the keyed cylinder may allow for the use of multiple different key cuts. For example, the keyed cylinder may allow for the use of a master key, a sub master key, and/or a specific key.

Figure 7:
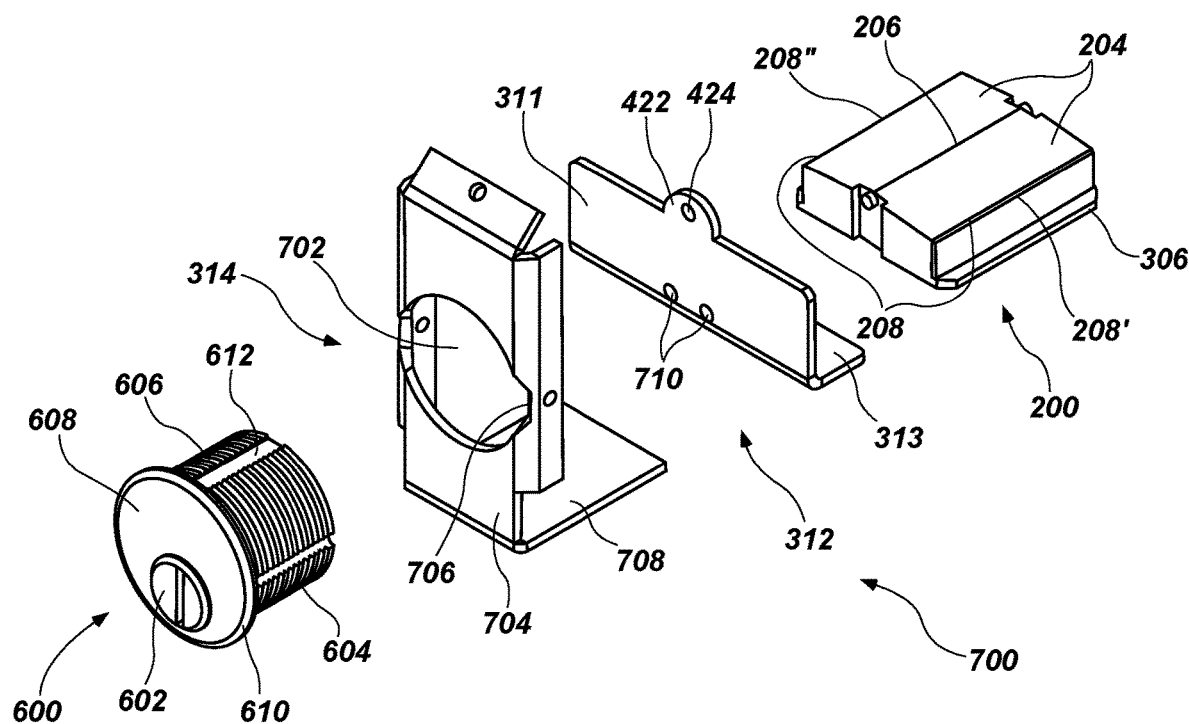
FIG. 7 shows an exploded view of an embodiment of a wireless transmitter assembly.

FIG. 7 illustrates an exploded view of an embodiment of a wireless transmitter assembly 700. In some embodiments, the wireless transmitter assembly may include the rotational input 600 with the lock actuator 602, a bracket 314 configured to secure the rotational input 600, and a rocker arm 312 configured to convert the rotational motion of the rotational input 600 to linear motion when the rocker arm interacts with the wireless switch 200.

In some embodiments, the bracket 314 may include an opening 702 (e.g., hole, orifice, notch, slot, or passage) that is complementary to the exterior portion 604 of the rotational input 600. In some embodiments, a face 608 of the rotational input 600 may form a ridge 610 with a diameter greater than a dimension of the opening 702 in the bracket 314 such that the ridge 610 may rest against a front surface 704 of the bracket 314 when the rotational input 600 is inserted into the bracket 314. In some embodiments, the exterior portion 604 may include helical threads 606 (e.g., straight threads, tapered threads, screw threads, etc.). The rotational input 600 may be secured to the bracket 314 with a fastener (e.g., nut with complementary threads, screw, bolt, wing nut, jam nut, or speed nut). In some embodiments, the bracket 314 may include complementary threads configured to allow the rotational input 600 to be threaded into the bracket 314. In some embodiments, the exterior portion 604 of the rotational input 600 may include an annular groove (e.g., recess) configured to receive a retaining element (e.g., spring washer, spring clip, wave washer, collar, etc.) on a side of the bracket 314 opposite the front surface 704 securing a side of the rotational input 600 opposite the face 608 of the rotational input 600. In some embodiments, the exterior portion 604 of the retaining element may include locating grooves 612 (e.g., channels, furrows, etc.). The bracket 314 may include complementary protrusions 706 (e.g., tabs) configured to interact with the locating groove 612 in the exterior portion 604 of the rotational input 600 to rotationally secure the rotational input 600 relative to the bracket 314.

In some embodiments, the bracket 314 may include a bottom portion 708 configured to secure the wireless switch 200 relative to the rotational input 600. The rocker arm 312 may be secured to the lock actuator 602 of the rotational input 600 such that when the lock actuator 602 rotates relative to the bracket 314 the rocker arm 312 also rotates relative to the bracket 314. In some embodiments, the rocker arm 312 may include mounting holes 710 through which mounting hardware (e.g., screws, bolts, rivets, brads, nails, pins, clips, etc.) may be inserted to secure the rocker arm 312 to the lock actuator 602 of the rotational input 600. In some embodiments, the rocker arm 312 may be secured to the lock actuator 602 by other methods such as, epoxy, welding, or adhesives.

When the rocker arm 312 and the lock actuator 602 rotate relative to the bracket 314 and wireless switch 200, the rocker arm 312 may contact the distal edges 208 of the switching panels 204 as described above actuating the energy harvester elements housed within the wireless switch 200. In some embodiments, the lock actuator 602 may provide additional security for systems where restricted access is desired or required before actuating the wireless switch 200.

Figure 8:
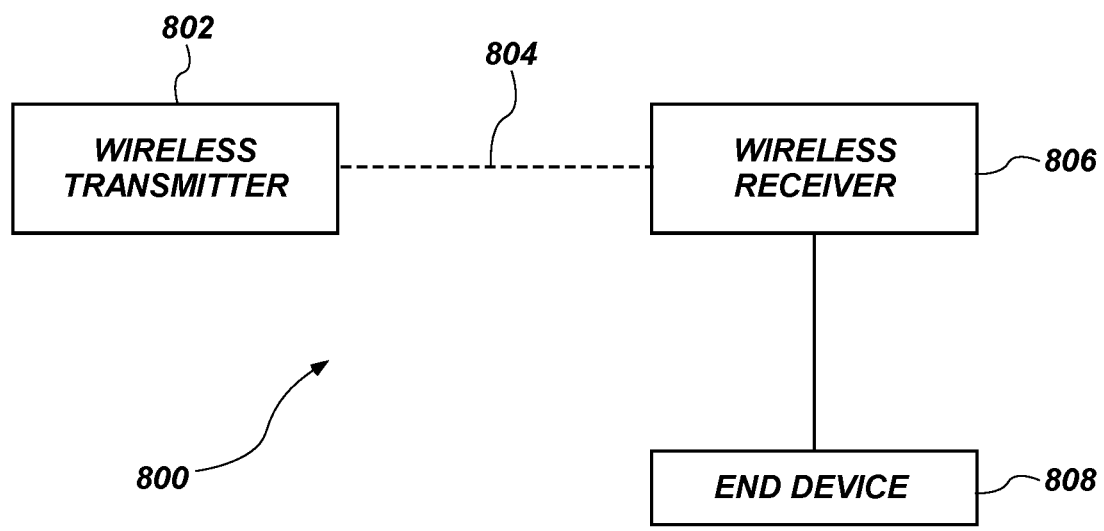
FIG. 8 shows a diagram of an embodiment of a wireless communication system.

FIG. 8 illustrates an embodiment of a wireless communication system 800. In some embodiments, the wireless communication system 800 may include a wireless transmitter 802. The wireless transmitter 802 may transfer a signal 804. The wireless communication system may include a wireless receiver 806 configured to receive the signal 804 from the wireless transmitter 802. The wireless receiver 806 may communicate with an end device 808 and cause the end device 808 to perform a function responsive the signal 804.

In some embodiments, the signal 804 may be transmitted over radio waves. For example, the signal 804 may be transmitted over a frequency between about 1 MHz and about 100 GHz, such as between about 100 MHz and about 1 GHz, or between about 300 MHz and about 900 MHz. The signal 804 generated by the wireless transmitter 802 may be strong enough to travel a distance of at least 30 meters, such as at least 60 meters, or at least 90 meters. Therefore, the wireless receiver 806 may be positioned a distance of up to 90 meters from the wireless transmitter 802 such as a distance up to about 60 meters, or a distance up to about 30 meters.

Now referring to FIGS. 7 and 8. In some embodiments, the wireless transmitter 802 may include the components of the wireless transmitter assembly 700. In some embodiments, the wireless transmitter assembly 700 may be configured to send different signals 804 responsive to different actions of the rotational input 600. For example, the wireless transmitter assembly 700 may send a first signal 804 when the rocker arm 312 contacts a first distal edge 208' of the switching panels 204; a second signal 804 when the rocker arm 312 releases the first distal edge 208' of the switching panels 204; a third signal 804 when the rocker arm 312 contacts a second distal edge 208" of the switching panels 204; and a fourth signal 804 when the rocker arm 312 releases the second distal edge 208" of the switching panels 204. In some embodiments, the wireless receiver 806 may translate the different signals 804 into different commands for the end device 808. For example, in some embodiments, the end device may be a powered door. The first signal may cause the door to begin opening; the second signal may cause the door to stop opening; the third signal may cause the door to start closing; and the fourth signal may cause the door to stop closing.

In some embodiments, there may be multiple end devices. For example, the first signal 804 may be interpreted by the wireless receiver 806 to cause a first end device to perform an operation such as opening a door, turning on a light, overriding a piece of equipment, activating an alarm system, etc. The second signal 804 may be translated by the wireless receiver 806 to determine if the wireless switch 200 returned to a neutral position. For example, the wireless receiver 806 may interpret the first signal 804 to perform an operation and then produce a notification (e.g., alarm, output, contact) to a monitoring system (e.g., fire alarm system, building automation system, security system, lighting system, etc.) if the second signal 804 is not received indicating that the switch has failed to return to the neutral position.

In some embodiments, the wireless receiver 806 may perform multiple processes responsive to each signal. For example, the wireless receiver may open a door, turn on lights and activate an HVAC system responsive to the first signal 804. In some embodiments, the wireless receiver may perform an operation such as opening a door, turning on a light, overriding a piece of equipment, and reporting the signal 804 to a monitoring system.

The embodiments of the present disclosure may allow rotational input to activate energy-autonomous wireless switches. Rotational input may be required for retrofitting equipment using dials and knobs, adhering to aesthetic requirements of dials and/or knobs, or access restriction using keys, and/or wireless key switches. Some embodiments of the present disclosure may allow restricted access to wireless switches or transmitters for use in different systems. Many users may desire or even require restricted access to switches. For example, door switches for electronically actuated doors may need to restrict access to the switches for actuating the doors. Medical equipment may require restricted access to switches that turn the equipment on and off or engage or disengage portions of the equipment. Buildings may desire restricted access to switches for occupying a system or floor and/or turning HVAC, lights, and/or equipment on and off. Industrial plants may desire restricted access to switches for enabling or disabling equipment.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A wireless transmitter comprising:
   a rotating actuator;
   a plate connected to the rotating actuator; and
   a wireless switch comprising at least one actuating panel configured to transmit mechanical energy to at least one transducer element configured to convert mechanical energy to electrical energy with an energy harvesting element;
   wherein the plate is configured to contact the wireless switch on rotation of the rotating actuator and the wireless switch is configured to transmit a wireless signal generated by the electrical energy.

2. The wireless transmitter of claim 1, wherein the rotating actuator further comprises a biasing element configured to return the rotating actuator to a starting position.

3. The wireless transmitter of claim 1, wherein the rotating actuator further comprises a lock actuator.

4. The wireless transmitter of claim 3, wherein the lock actuator requires a key inserted into the lock actuator before allowing the rotating actuator to rotate.

5. The wireless transmitter of claim 1, further comprising a bracket configured to mount the rotating actuator and define a specified distance between the wireless switch and the rotating actuator.

6. The wireless transmitter of claim 5, wherein the specified distance is configured to allow at least 10 degrees of rotation of the rotational engagement before the plate contacts the wireless switch.

7. The wireless transmitter of claim 5, wherein the bracket comprises an adjustable member configured to adjust the specified distance between the wireless switch and the rotational engagement.

8. The wireless transmitter of claim 1, wherein the wireless transmitter does not comprise a battery or other power source other than the at least one transducer.

9. A wireless communication system comprising:
   an energy-autonomous wireless transmitter configured to transmit a signal comprising:
   a rotating actuator;
   a plate connected to the rotating actuator; and
   a wireless switch comprising at least one actuating panel configured to transmit mechanical energy to at least one transducer element configured to convert the mechanical energy to electrical energy with an energy harvesting element and produce the signal from the electrical energy;
   wherein the plate is configured to rotate with the rotating actuator and contact the wireless switch on rotation of the rotating actuator and transmit the signal produced from the electrical energy; and
   a receiver configured to receive the signal and perform an operation based on the signal.

10. The wireless communication system of claim 9, wherein the energy-autonomous wireless transmitter is configured to transmit the signal between 100 MHz and 1 GHz.

11. The wireless communication system of claim 9, wherein the signal is configured to travel a distance of at least 30 meters.

12. The wireless communication system of claim 9, wherein the wireless switch comprises at least two transducer elements.

13. The wireless communication system of claim 12, wherein the at least one actuating panel is configured to transmit the mechanical energy to the at least two transducer elements individually and the energy-autonomous wireless transmitter is configured to transmit a different signal depending upon which of the at least two transducer elements receive the mechanical energy from the at least one actuating panel.

14. The wireless communication system of claim 13, wherein the receiver is configured to perform different operations depending upon which signal is received from the energy-autonomous wireless transmitter.

15. A method of transmitting a wireless signal, comprising:
   rotating a rotating actuator attached to a plate;
   contacting a wireless switch with the plate on rotation of the rotating actuator;
   inputting mechanical energy to the wireless switch through the contact between the wireless switch and the plate;
   converting the mechanical energy into electrical energy with an energy harvesting element; and
   transmitting a signal with the electrical energy.

16. The method of transmitting a wireless signal of claim 15, further comprising defining the rotational range of the rotating actuator with a mounting bracket configured to define a distance between the rotating actuator and the wireless switch.

17. The method of transmitting a wireless signal of claim 15, further comprising returning the rotating actuator to an initial position after rotating the rotating actuator.

18. The method of transmitting a wireless signal of claim 17, wherein returning the rotating actuator to the initial position comprises engaging the rotating actuator with a biasing element.

19. The method of transmitting a wireless signal of claim 17 comprising:
   releasing the contact between the wireless switch and the plate;

inputting a second mechanical energy through the release of the contact between the wireless switch and the plate;
converting the second mechanical energy into a second electrical energy; and
transmitting a second signal with the second electrical energy.

* * * * *